(12) United States Patent
Xing et al.

(10) Patent No.: US 10,013,111 B2
(45) Date of Patent: Jul. 3, 2018

(54) TOUCH PANEL DISPLAY DEVICE HAVING OPTIMAL TRANSMISSION PATHS AND RELATED ARRAY SUBSTRATE

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Zhenzhou Xing, Guangdong (CN); Xiaoping Tan, Guangdong (CN); Qingcheng Zuo, Guangdong (CN)

(73) Assignees: Shenzhen China Star Optoelectronics Technology Co., Ltd., Shenzhen, Guangdong (CN); Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 75 days.

(21) Appl. No.: 14/783,859

(22) PCT Filed: Sep. 9, 2015

(86) PCT No.: PCT/CN2015/089220
§ 371 (c)(1),
(2) Date: Oct. 10, 2015

(87) PCT Pub. No.: WO2017/028345
PCT Pub. Date: Feb. 23, 2017

(65) Prior Publication Data
US 2017/0153757 A1    Jun. 1, 2017

(30) Foreign Application Priority Data
Aug. 19, 2015 (CN) .......................... 2015 1 0511008

(51) Int. Cl.
*G06F 3/041* (2006.01)
*G06F 3/044* (2006.01)
(Continued)

(52) U.S. Cl.
CPC ........ *G06F 3/0418* (2013.01); *G02F 1/13338* (2013.01); *G02F 1/134309* (2013.01);
(Continued)

(58) Field of Classification Search
CPC .......................................... G06F 3/041–3/0418
See application file for complete search history.

(56) References Cited

U.S. PATENT DOCUMENTS

2003/0086048 A1* 5/2003 Ukita .................... G02F 1/1345
349/149
2010/0201647 A1  8/2010 Verweg
(Continued)

FOREIGN PATENT DOCUMENTS

CN    101673016 A    3/2010
CN    201503579 U    6/2010
(Continued)

*Primary Examiner* — Sanghyuk Park
(74) *Attorney, Agent, or Firm* — Tom Abeles; Andrew C. Cheng

(57) ABSTRACT

The present invention proposes a touch panel display device and an array substrate. A touch panel display device includes a touch detecting circuit, touch detecting electrodes, and transmission paths. One terminal of each of the transmission paths is connected to one of the touch detecting electrodes, and the other terminal of each of the transmission paths is connected to the touch detecting circuit, for transmitting a touch signal of the touch detecting electrode to the touch detecting circuit. A difference of variation for each touch signal of the touch detecting electrodes is smaller than a first predetermined value after being transmitted through each of the transmission paths. The first predetermined value is a threshold by which false identification occurs among the touch signals from the touch detecting electrodes. The present invention improves sensitivity of touch.

12 Claims, 4 Drawing Sheets

(51) Int. Cl.
*G02F 1/1333* (2006.01)
*G02F 1/1343* (2006.01)

(52) U.S. Cl.
CPC ............ *G06F 3/044* (2013.01); *G06F 3/0412* (2013.01); *G02F 2201/121* (2013.01)

(56) References Cited

U.S. PATENT DOCUMENTS

| | | |
|---|---|---|
| 2011/0291994 A1 | 12/2011 | Kwak et al. |
| 2012/0092273 A1* | 4/2012 | Lyon ..................... G06F 3/0412 345/173 |
| 2013/0277186 A1* | 10/2013 | Sekizawa ........... H03K 17/9618 200/181 |
| 2014/0218328 A1 | 8/2014 | Haapakoski et al. |
| 2015/0029144 A1 | 1/2015 | Jo et al. |
| 2016/0162079 A1* | 6/2016 | Jing ........................ G06F 3/045 345/174 |
| 2016/0291754 A1 | 10/2016 | Jin |
| 2017/0024060 A1* | 1/2017 | Seong ..................... G06F 3/044 |

FOREIGN PATENT DOCUMENTS

| | | |
|---|---|---|
| CN | 204215386 U | 3/2015 |
| CN | 104810002 A | 7/2015 |
| KR | 20130132061 A | 12/2013 |

* cited by examiner

TOUCH PANEL DISPLAY DEVICE HAVING OPTIMAL TRANSMISSION PATHS AND RELATED ARRAY SUBSTRATE

BACKGROUND OF THE INVENTION

1. Field of the Invention

The present invention relates to touch panel technology field, more particularly to a touch panel display device and an array substrate thereof.

2. Description of the Prior Art

Compared to resistance touch panels, capacitive touch panels have better visibility, are capable of multi-touch, and possess greater usage flexibility. Therefore most touch panels in the market are capacitive touch panels.

Capacitive touch panels are an application of capacitive touch panel technology, which is a kind of touch panel technology realized by touch panel coordinates, attained by changes in capacitance, caused by fingers approaching capacitive touch panels. There are two important variables of capacitive touch panel technology. The first is the sensing capacitance between fingers and an upper sensing layer. The second is the parasitic capacitance between sensing layers or between a sensing layer and an optical panel. Generally speaking, the capacitance is determined by the ITO pattern relative to a driving electrode TX and a sensing electrode RX (i.e., the relative area of TX and RX), and the thickness as well as between the driving electrode TX and the sensing electrode RX. The value of capacitance has no relationship with circuit impedance.

In conventional technology, no matter if a touch panel integrated circuit (TP IC) and a source IC are put on a same flexible printed circuit (FPC) or on two different FPCs, the issue of unequal impedance values of wires in cabling between sensing electrodes and TP ICs are ignored. As shown in FIG. 1, surrounding the display area is a plurality of leads 12 connecting a touch detecting electrode 11. Regarding the position of the display panel, the leads 12 run in different lengths towards a TP IC 13, meaning different impedance values thereof, resulting in different levels of change in sensing signals of the touch detecting electrode 11 when passing through the leads 12. For example, two sensing signals, which in the beginning have a greater difference, turn to have a smaller difference after passing through two wires in different lengths. This may easily lead to false signal recognition, affecting sensitivity of touch panels.

SUMMARY OF THE INVENTION

An object of the present invention is to propose a touch panel display device and an array substrate for improving sensitivity of touch.

According to the present invention, a touch panel display device which is a liquid crystal display (LCD) with a function of touch detection, comprises: a touch detecting circuit; a plurality of touch detecting electrodes, used as common electrodes of the LCD; and a plurality of transmission paths, one terminal of each of the plurality of transmission paths connected to one of the plurality of touch detecting electrodes, and the other terminal of each of the plurality of transmission paths connected to the touch detecting circuit, for transmitting a touch signal of the touch detecting electrode to the touch detecting circuit. An electrical impedance of the plurality of transmission paths is identical so that a difference of variation for each touch signal of the plurality of touch detecting electrodes is smaller than a first predetermined value after being transmitted through each of the plurality of transmission paths, and the first predetermined value is a threshold by which false identification occurs among the touch signals from the plurality of touch detecting electrodes.

Furthermore, the plurality of transmission paths are a plurality of leads, the length of plurality of leads are identical so that electrical impedances of the plurality of transmission paths are identical.

Furthermore, the touch panel display device comprises a display panel and a flexible printed circuit (FPC), the plurality of touch detecting electrodes are arranged on the display section of the display panel, and the touch detecting circuit is arranged on the FPC. Each of the plurality of leads comprises a first portion and a second portion. The first portion and the second portion are connected to each other. The first portion is located on a non-display section and connected to a corresponding touch detecting electrode. The second portion is on the FPC and connected to a corresponding touch detecting electrode. The length of the first portion decease successively. The length of the second portion increase successively. The first portion and the second portion are connected so that the lengths of the plurality of leads are equal, or the difference of the length of the plurality of leads are smaller than a second predetermined value, and the second predetermined value being a threshold by which false identification occurs among the touch signals from the plurality of touch detecting electrodes.

Furthermore, a plurality of path layers are arranged on the FPC, the second portion of the plurality of leads are formed on surfaces of the plurality of path layers, respectively, the second portion extends along the plurality of path layers to the touch detecting circuit and are connected to the touch detecting circuit; a bump being disposed on the surfaces of some of the plurality of path layers, the number of the bump of at least some of the plurality of path layers increasing successively, a surface of the bump as part of the surface of the path layer, the second portion of at least some of the leads passing through the surface of the bump on a corresponding path layer and extending along the path layer so that the length of the second portion increasing successively.

Furthermore, the touch panel display device comprises a display panel and an FPC, the plurality of touch detecting electrodes are arranged on the display section of the display panel, and the touch detecting circuit is arranged on the FPC; each of the plurality of transmission paths comprising a lead, at least some of the plurality of transmission paths further comprising a resistor, the resistor and a lead of a corresponding transmission path connected in series, and the resistor arranged on the FPC; the plurality of leads of the plurality of transmission paths arranged in the non-display section of the display panel, the length of the plurality of leads decreasing successively, a numerical value of resistance of a resistor corresponding to the at least some of the plurality of transmission paths increasing successively so that an electrical impedance of the plurality of transmission paths being identical, or the difference of the length of the plurality of leads are smaller than a third predetermined value, and the third predetermined value being a threshold by which false identification occurs among the touch signals from the plurality of touch detecting electrodes.

According to the present invention, a touch panel display device comprises: a touch detecting circuit; a plurality of touch detecting electrodes; and a plurality of transmission paths, one terminal of each of the plurality of transmission paths connected to one of the plurality of touch detecting electrodes, and the other terminal of each of the plurality of transmission paths connected to the touch detecting circuit, for transmitting a touch signal of the touch detecting electrode to the touch detecting circuit. A difference of variation for each touch signal of the plurality of touch detecting electrodes is smaller than a first predetermined value after being transmitted through each of the plurality of transmission paths. The first predetermined value is a threshold by which false identification occurs among the touch signals from the plurality of touch detecting electrodes.

Furthermore, an electrical impedance of the plurality of transmission paths is identical so that the difference of variations for the touch signals of the plurality of touch detecting electrodes is smaller than the first predetermined value after being transmitted through each of the plurality of transmission paths.

Furthermore, the plurality of transmission paths is a plurality of leads, the length of plurality of leads are identical so that electrical impedances of the plurality of transmission paths are identical.

Furthermore, the touch panel display device comprises a display panel and a flexible printed circuit (FPC), the plurality of touch detecting electrodes are arranged on the display section of the display panel, and the touch detecting circuit is arranged on the FPC; each of the plurality of leads comprising a first portion and a second portion, the first portion and the second portion being connected to each other, the first portion being located on a non-display section and connected to a corresponding touch detecting electrode, the second portion being on the FPC and connected to a corresponding touch detecting electrode, the length of the first portion decreasing successively, the length of the second portion increasing successively, the first portion and the second portion being connected so that the lengths of the plurality of leads are equal, or the difference of the length of the plurality of leads are smaller than a second predetermined value, and the second predetermined value being a threshold by which false identification occurs among the touch signals from the plurality of touch detecting electrodes.

Furthermore, a plurality of path layers are arranged on the FPC, the second portion of the plurality of leads are formed on surfaces of the plurality of path layers, respectively, the second portion extends along the plurality of path layers to the touch detecting circuit and are connected to the touch detecting circuit; a bump being disposed on the surfaces of some of the plurality of path layers, the number of the bump of at least some of the plurality of path layers increasing successively, a surface of the bump as part of the surface of the path layer, the second portion of at least some of the leads passing through the surface of the bump on a corresponding path layer and extending along the path layer so that the length of the second portion increasing successively.

Furthermore, the touch panel display device comprises a display panel and an FPC, the plurality of touch detecting electrodes are arranged on the display section of the display panel, and the touch detecting circuit is arranged on the FPC; each of the plurality of transmission paths comprising a lead, at least some of the plurality of transmission paths further comprising a resistor, the resistor and a lead of a corresponding transmission path connected in series, and the resistor arranged on the FPC; the plurality of leads of the plurality of transmission paths arranged in the non-display section of the display panel, the length of the plurality of leads decreasing successively, a numerical value of resistance of a resistor corresponding to the at least some of the plurality of transmission paths increasing successively so that an electrical impedance of the plurality of transmission paths being identical, or the difference of the length of the plurality of leads are smaller than a third predetermined value, and the third predetermined value being a threshold by which false identification occurs among the touch signals from the plurality of touch detecting electrodes.

Furthermore, the touch panel display device comprises a display panel and an FPC, the plurality of touch detecting electrodes are arranged on the display section of the display panel, and the touch detecting circuit is arranged on the FPC; each of the plurality of transmission paths comprising a lead, at least some of the plurality of transmission paths comprising an operational amplifier, the operational amplifier comprising an input terminal connected to the lead of a corresponding transmission path, the operational amplifier comprising an output terminal connected to the touch detecting circuit for amplifying a touch signal transmitted through the lead of the corresponding transmission path; the plurality of leads of the plurality of transmission paths are arranged on the non-display section of the display panel, the lengths of the plurality of leads increasing successively, at least some of the plurality of leads having successively increasing lengths being connected to the operational amplifier having a successively increasing ability to amplify signals so that the difference of variations for the touch signals is smaller than the first predetermined value after being transmitted through each of the plurality of transmission paths.

Furthermore, the touch panel display device is an LCD with a function of touch detection, and the plurality of touch detecting electrodes are used as common electrodes of the LCD.

According to the present invention, an array substrate used in a touch panel display device, comprises: a touch detecting circuit; a plurality of touch detecting electrodes; and a plurality of transmission paths, one terminal of each of the plurality of transmission paths connected to one of the plurality of touch detecting electrodes, and the other terminal of each of the plurality of transmission paths connected to the touch detecting circuit, for transmitting a touch signal of the touch detecting electrode to the touch detecting circuit. A difference of variation for each touch signal of the plurality of touch detecting electrodes is smaller than a first predetermined value after being transmitted through each of the plurality of transmission paths.

Furthermore, the plurality of touch detecting electrodes are used as common electrodes of the array substrate.

In contrast to the conventional technology, one terminal of each transmission path is connected to a touch detecting electrode and the other terminal of each transmission path is connected to a touch detecting circuit in the present invention. The present invention makes it possible that the difference of variation for each touch signal is smaller than a first predetermined value after being transmitted through each of the plurality of transmission paths. The first predetermined value is a threshold by which false identification occurs among the touch signals from the plurality of touch detecting electrodes. So the differences of the touch signals of the plurality of touch detecting electrodes passing through a plurality of transmission paths are almost the same. In other words, the influence of the plurality of transmission paths on the touch signals is basically the same to make sure that the transmitting environment of each touch signal is basically identical and that the differences among the plurality of touch signals are basically the same whether before or after the plurality of touch signals are transmitted. It helps reduce the probability of false identification of the plurality of touch signals. Also, it improves sensitivity of touch.

DETAILED DESCRIPTION OF THE PREFERRED EMBODIMENTS

The drawings illustrate embodiments of the invention and, together with the description, serve to explain the principles of the invention.

Figure 1:
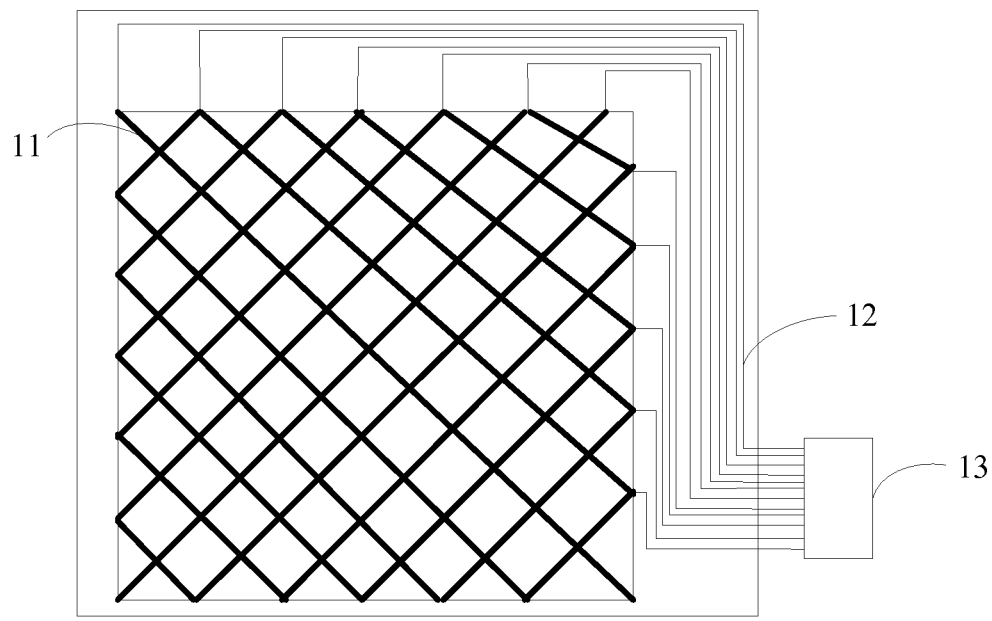
FIG. 1 shows leads connecting to touch detecting electrodes in a conventional touch panel display device.
Figure 2:
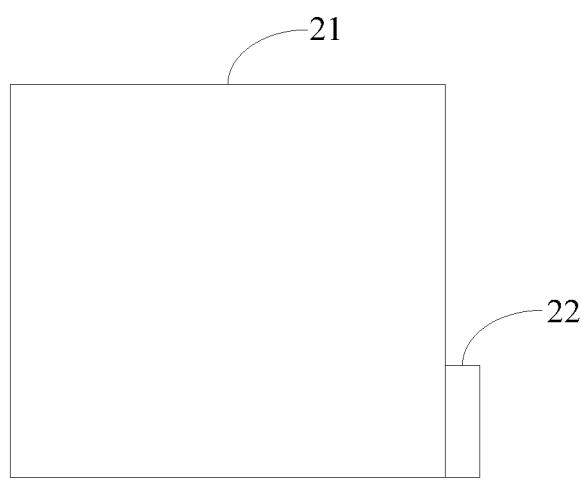
FIG. 2 shows a schematic diagram of a touch panel display device according to a preferred embodiment of the present invention.
Figure 3:
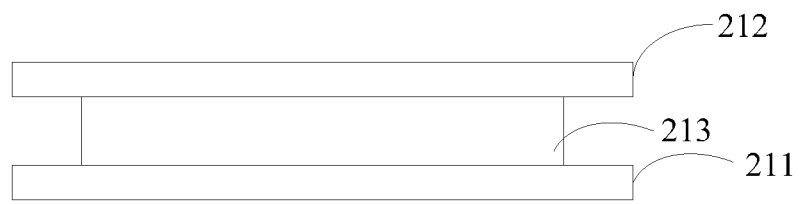
FIG. 3 shows a schematic diagram of a display panel of the touch panel display device shown in FIG. 2 according to a preferred embodiment of the present invention.
Figure 4:
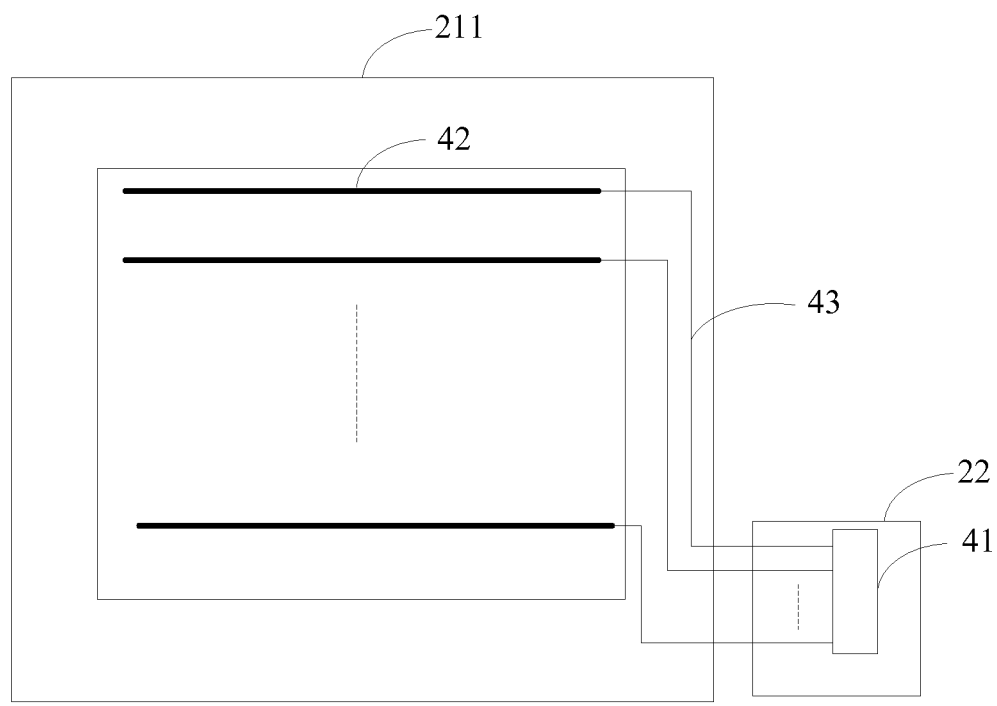
FIG. 4 shows a schematic diagram of an array substrate of the display panel shown in FIG. 3 according to a preferred embodiment of the present invention.

Please refer to FIG. 2 to FIG. 4. A touch panel display device used in the present invention is a liquid crystal display (LCD) or an organic light-emitting diode (OLED) display with a function of touch detection. The touch panel display device comprises a display panel 21 and a flexible printed circuit (FPC) 22. As FIG. 3 shows, the display panel 21 comprises an array substrate 211, a color filter substrate 212, and a liquid crystal layer 213 sandwiched between the array substrate 211 and the color filter substrate 212.

Please refer to FIG. 4. A touch detecting circuit 41 is disposed on the FPC 22. The array substrate 211 comprises a plurality of touch detecting electrodes 42 and a plurality of transmission paths 43. The plurality of touch detecting electrodes 42 are disposed on the display section of the array substrate 211 and used as common electrodes of the array substrate 211.

One terminal of each of the plurality of transmission paths 43 is connected to one of the plurality of touch detecting electrode 42, and the other terminal connected of each of the plurality of transmission paths 43 is connected to the touch detecting circuit 41. Touch signals from the plurality of touch detecting electrode 42 are transmitted to the touch detecting circuit 41 through the plurality of transmission paths for effectuating the touch function. Since the touch signals from the plurality of touch detecting electrodes 42 are transmitted through the plurality of transmission paths 43, the difference of variations for the touch signals is smaller than a first predetermined value. The first predetermined value is a threshold by which false identification occurs among the touch signals from the plurality of touch detecting electrodes 42.

The variation of the touch signal can be represented by the ratio of the absolute value of the difference of the touch signal before and after transmittance to the value of the touch signal before transmittance. The formula is as follows:

$$\text{variation} = (|A-B|)/A$$

where A represents the value of the touch signal before transmitting through the transmission path 43, and B represents the value of the touch signal after transmitting through the transmission path 43.

The touch signal changes because being affected by the circuit impedance of the transmission path 43 through which the touch signal is transmitted. The size of the touch signal is generally reduced. The present embodiment makes it possible that the difference of variation for each touch signal is smaller after being transmitted through each of the plurality of transmission paths 43. In other words, the influence of the plurality of transmission paths 43 on the touch signals is basically the same to make sure that the transmitting environment of each touch signal is basically identical and that the differences among the plurality of touch signals are basically the same whether before or after the plurality of touch signals are transmitted. It helps reduce the probability of false identification of the plurality of touch signals due to some of the plurality of touch signals with obvious variations and the others with slight variations. Also, it improves sensitivity of touch.

For example, for a capacitive touch panel display device, a touch signal (i.e., a sensing capacitor) generated by a touch detecting electrode 42 transmitted before the transmission path 43 is 1 pF, and a touch signal (i.e., a sensing capacitor) generated by another touch detecting electrode 42 transmitted before the transmission path 43 is 0.8 pF. The influence of the leads of the conventional transmission paths with different lengths on the touch signals is different. A touch signal of the touch detecting electrode passing through the conventional transmission path decreases from 1 pF to 0.8 pF, which means that the variation is 15%. Another touch signal of the touch detecting electrode passing through the conventional transmission path decreases from 0.8 pF to 0.78 pF, which means that the variation is 2%. Since the difference between the two variations is slight large, the difference of the variations of the touch signals before or after being transmitted is slight large, which means that it is very likely to have false identification of the touch signals. On the contrary, the difference of the variations of the touch signals before or after passing through the transmission path 43 is smaller in this embodiment. For example, a touch signal of the touch detecting electrode passing through the conventional transmission path decreases from 1 pF to 0.8 pF, which means that the variation is 15%. Another touch signal of the touch detecting electrode passing through the conventional transmission path decreases from 0.8 pF to 0.688 pF, which means that the variation is 14%. The difference of the variations of the touch signals before or after being transmitted is roughly the same. It helps identify the touch signals correctly.

The first predetermined value is a threshold by which false identification occurs among the touch signals from the plurality of touch detecting electrodes and can be set according to real conditions in this embodiment. For example, when the difference of variation of touch signals is smaller than or equal to 0.03, probability of false identification of touch signals is extremely low; when the difference of variation of touch signals is larger than 0.03, false identification of touch signals easily occurs. So, 0.03 can be set as 0.03. Therefore, it is of no problem that the influence of each of the plurality of transmission paths on the touch signals is slightly different. A touch signal is affected by loop impedance of the transmission path through which the touch signal is transmitted, and the variation because of the affection is 10%. Another touch signal is affected by loop impedance of the transmission path through which the touch signal is transmitted, and the variation because of the affection is 8%. Although differences exist between the touch signals passing through the transmission path, the difference of 2% does not tend to result in false identification of touch signals.

So the first predetermined value can be set according to practical demands. The first predetermined value will not be limited here. Of course, it is also possible to control the influence of the plurality of transmission paths on the touch signals to be the same on the premise of proper practical production conditions. That is, the variation of each of the touch signals after transmitting through the corresponding transmission path is the same. In other words, the difference of the variation of each of the touch signals is zero.

Figure 5:
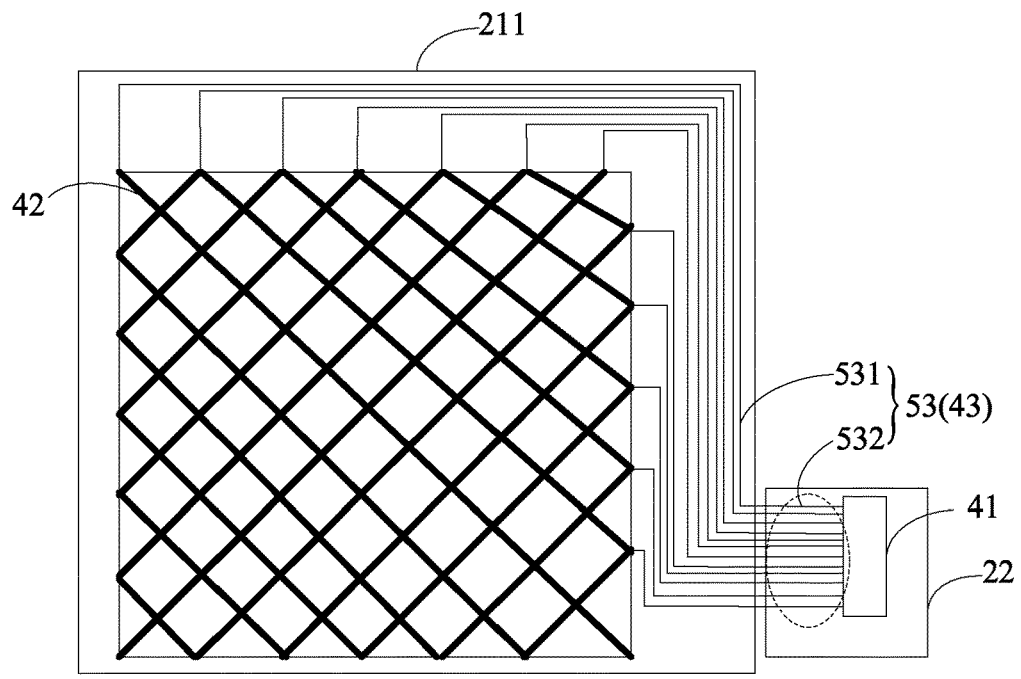
FIG. 5 shows a schematic diagram of an array substrate shown in FIG. 4 according to a first preferred embodiment of the present invention.

Please refer to FIG. 5. The electrical impedance of the plurality of transmission paths 43 is identical so that the difference of variations for the touch signals is smaller than a first predetermined value for the touch panel display device in one concrete embodiment of the present invention. It is understood that to ensure the electrical impedance of all of the plurality of transmission paths 43 identical is hard because of some technical factors in real conditions. Each of the touch signals still has some differences after being transmitted through corresponding transmission paths 43 with the roughly equal electrical impedance. The difference of variations for the touch signals is smaller than the first predetermined value in this embodiment to reduce differences of variation of the touch signals. It helps reduce the probability of false identification of the touch signals.

The plurality of transmission paths 43 are a plurality of leads 53 in this embodiment. The length of each of the plurality of leads 53 is the same so the electrical impedance of the plurality of transmission paths 43 is identical. Further, each of the plurality of leads 53 comprises a first portion 531 and a second portion 532 in this embodiment. The first portion 531 and the second portion 532 are connected to each other. The first portion 531 is located on a non-display section of the array substrate 211 and connected to the corresponding touch detecting electrode 42. The second portion 532 is located on the FPC 22 and connected to the corresponding touch detecting electrode 42.

As FIG. 5 shows, the first portion 531 is wired successively on the non-display section inwards to outwards. The length of the first portion 531 decreases successively. The length of the second portion 532 increases successively. The first portion 531 and the second portion 532 are connected so that the lengths of the plurality of leads 53 are equal, or the difference of the length of the plurality of leads 53 are smaller than a second predetermined value. The second predetermined value is a threshold by which false identification occurs among the touch signals from the plurality of touch detecting electrodes 42.

For example, the first portion 531 located on the most outward non-display section is longest, and the second portion 532 connected to the first portion 531 located on the most outward non-display section is shortest; the first portion 531 located on the most inward non-display section is shortest, and the second portion 532 connected to the first portion 531 located on the most inward non-display section is longest. The rest can be done in the same manner. Therefore, the lengths of the plurality of leads 53 are equal, or the difference of the length of the plurality of leads 53 are smaller than the second predetermined value. The lengths of the second portions 532 of the plurality of leads 53 can be arranged according to the lengths of the corresponding first portions 531 of the plurality of leads 53. A longer first portion 531 corresponds to a shorter second portion 532, and a shorter first portion 531 corresponds to a longer second portion 532.

The principle of the resistivity of leads tells that the resistor of the lead is related to the length of the lead, resistivity of the lead, and the sectional area of the lead. The plurality of leads 53 are fabricated from the same material and have the same size and shape in this embodiment. The electrical impedance of each of the plurality of leads 53 is the same since the lengths of the plurality of leads 53 are the same. It ensures that the transmitting environment of each touch signal is basically identical so that each of the touch signals is equally affected by the lead 53 when the touch signals are transmitted through the plurality of leads 53, respectively. It helps reduce the probability of false identification of the touch signals.

Figure 6:
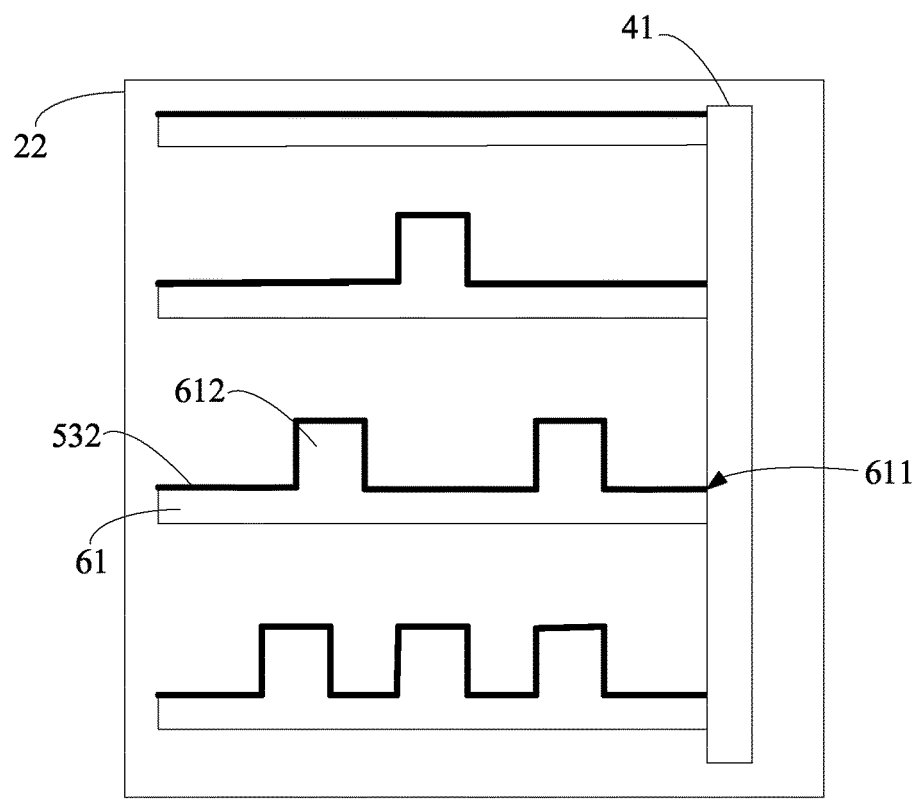
FIG. 6 enlarges a second portion of the leads on the flexible printed board on the array substrate.

Further, the second portion 532 can become longer successively by dealing with the FPC 22. Please refer to FIG. 6. FIG. 6 is an enlargement diagram of a broken circle in the FPC 22 shown in FIG. 5. FIG. 6 only shows the routing of the partial second portion 532. A plurality of path layers 61 are arranged on the FPC 22. The second portions 532 of the plurality of leads 53 are formed on surfaces 611 of the plurality of path layers 61, respectively. The second portions 532 extend along the length direction of the plurality of path layers 61 to the touch detecting circuit 41 and are connected to the touch detecting circuit 41.

A bump 612 is disposed on the surfaces 611 of at least some of the plurality of path layers 61. The surface of the bump 612 is used as a part of the surface 611 of the path layers 61. The bump 612 can be a square, a curve, a cone, etc. as FIG. 6 shows. The number of the bump 612 of at least some of the plurality of path layers 61 increases successively. The second portions 532 of at least some of the plurality of leads 53 pass the surface of the bump 612 and extend along the length direction of the plurality of path layers 61 so that the length of the second portions 532 can increase successively.

The lead 53 comprises the longer first portion 531 and the shorter second portions 532. It is possible to not arrange any bumps 612 on the corresponding path layer 61. The surface 611 of the path layer 61 is flat. The second portions 532 extend along the surface of the path layer 61 to the touch detecting electrode 41. The path layer 61 as FIG. 6 shows comprises a shorter first portion 531 and a longer second portion 532. A plurality of bumps 612 can be arranged on the corresponding path layer 61. The second portions 532 extend along the surface of the path layer 61 to the touch detecting electrode 41 so that the second portions 532 can be longer. The more and the higher the bump 612 is, the longer the second portions 532 is. Also, the more the side of the bump 612 is, the longer the second portions 532 is. For example, the bump 612 of a hexagonal has a longer second portion 532 than the bump 612 of a square does. The height indicates the height of the bump from the surface of path layer 61. Therefore, the number, shape, or height of the bump 612 of the path layer 61 corresponding to the second portions 532 can be determined depending on the length of the second portions 532 in reality as long as the length of the plurality of leads 53 is identical or the difference of the length of the plurality of leads 53 is smaller than the second predetermined value.

Layering on the FPC 22 is for forming the path layer 61. For example, two copper layers are formed on the FPC 22, and the upper copper layer is punched. In other words, some of the upper copper layer is dug out for the lower copper layer to form a bump 612. Off course, it is possible to form a thicker copper layer. Some of the thicker copper layer is dug out for forming a bump.

The path layer 61 with the bump 612 is arranged on the FPC 22 so that the second portion 532 of the lead 53 can be extended. Since the lengths of the plurality of leads are equal without any change of the display panel 21, it is beneficial to reduce the technical demands and costs.

Of course, it is possible to arrange the path layer 61 on the non-display section of the array substrate to enhance accuracy of the routing in other embodiments. The lengths of the second portions 532 of the plurality of leads 53 are identical. Also, the first portions 531 of the plurality of leads 53 are formed on the surfaces of the plurality of the path layers 61, respectively, and extend along the surfaces of the plurality of the path layers 61. A bump is disposed on the surfaces of some of the plurality of path layers 61 so as to make the first portions 531 of the plurality of leads 53 longer. So, a corresponding number of bumps are arranged depending on the required length of the first portions 531 so as to make the length of the first portions 531 of the plurality of leads 53 identical. It makes it possible that the length of the plurality of leads 53 is identical and the electrical impedance of the plurality of leads 53 is identical.

The length of the second portion 532 is arranged based on the length of the first portion 531. The lead 53 comprises a longer first portion and a shorter second portion. Or the lead 53 comprises a shorter first portion and a longer second portion. The length of the first portion centers around the location of the touch detecting electrode. For the routing of the first portion to be another type of arrangement, the first portion of one of the leads is a symmetrical line and the first portions of other leads are arranged on the both sides of the symmetrical line. The length of the first portions of all of the leads increases successively from the center of the symmetrical line to the both sides of the symmetrical line. The length of the second portions of all of the corresponding leads decreases successively from the center of the second portions of the lead corresponding to the symmetrical line to the both sides of the center of the second portions of the lead corresponding to the symmetrical line.

Figure 7:
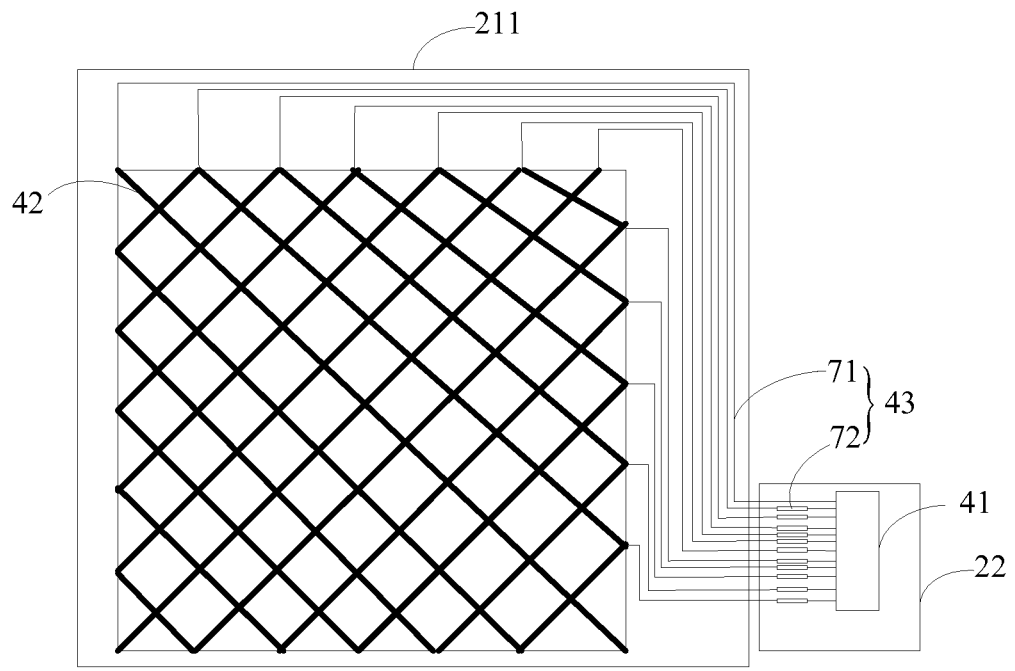
FIG. 7 shows a schematic diagram of an array substrate shown in FIG. 4 according to a second preferred embodiment of the present invention.

Please refer to FIG. 7. The arrangement of resistors makes the electrical impedance of a plurality of transmission paths 43 identical in one concrete embodiment of the present invention. The components with identical markers have the same functions in FIG. 7. Specifically, each of the plurality of transmission paths 43 comprises a lead 71. Some of the plurality of transmission paths 43 further comprises a resistor 72. It is possible to plan the plurality of transmission paths 43 to comprise a lead 71 and a resistor 72 to make the electrical impedance of the plurality of transmission paths 43 equal. The lead 71 and the resistor 72 connected in series. One terminal of the lead 71 is connected to a touch detecting electrode 42, and the other of the lead 71 is connected to the resistor 72. The other terminal of the resistor 72 is connected to a touch detecting circuit 41. As for a transmission path 43 which is not required to comprise a resistor 72, one terminal of the lead 71 is connected to a corresponding touch detecting electrode 42, and the other of the lead 71 is connected to a touch detecting circuit 41.

The plurality of leads 71 of the plurality of transmission paths 43 are arranged on the non-display section of the array substrate 211. The lengths of the plurality of leads 71 increase successively. The numerical values of resistance of the resistors 72 corresponding to at least some of the plurality of leads 71 having successively increasing lengths increase successively. So the electrical impedances of the plurality of transmission paths 43 are equal. The arrangement of the resistors 72 helps compensate the electrical impedances of the plurality of transmission paths 43 having shorter leads 71 so that the electrical impedances of the plurality of transmission paths 43 can be equal.

The longer the lead is, the larger the resistor is. In this embodiment, the lengths of the plurality of leads 71 increase successively. It is possible that no resistors arranged on the transmission path 43 corresponding to the longest lead 71. The resistor of the longest lead 71 is larger than the resistors of other shorter leads 71. So, the numerical value of resistance of the longest lead 71 can be taken a reference as values of the resistors are shown when other shorter leads 71 are connected to the corresponding resistors 72.

For example, for five transmission paths 43, the length of five leads 71 for the five transmission paths 43 decreases successively. The longest lead 71 is 5 Ohm, the other leads 71 are 4.5 Ohm, 4 Ohm, 3 Ohm, and 2 Ohm successively. The difference between the numerical value of resistance the longest lead 71 and the numerical value of resistance of the other four leads 71 is 0.5 Ohm, 1 Ohm, 2 Ohm, and 3 Ohm successively. It is possible that the other four leads 71 are connected to resistors 72 in series, respectively. The resistors 72 are 0.5 Ohm, 1 Ohm, 2 Ohm, and 3 Ohm, respectively. Therefore, the electrical impedance of the transmission path 43 is the sum of the numerical value of resistance of the corresponding lead and the numerical value of resistance of the resistor. So the electrical impedance of each of the plurality of transmission paths 43 is 5 Ohm.

Therefore, the present embodiment makes it possible that the electrical impedance of each of the plurality of transmission paths 43 is the same. Once it is hard to be totally equal, it is possible to allow the difference of the electrical impedance of the plurality of transmission paths 43 to be smaller than a third predetermined value. The third predetermined value is a threshold by which false identification occurs among the touch signals from the plurality of touch detecting electrodes 42. When the difference of the electrical impedance of the plurality of transmission paths 43 is smaller than 0.5 Ohm, it is hard to have false identification of signals. But, when the difference of the electrical impedance of the plurality of transmission paths 43 is larger than 0.5 Ohm, it is easy to have false identification of signals. So, 0.5 Ohm can be set as the third predetermined value as long as the electrical impedance of the plurality of transmission paths 43 is smaller than 0.5 Ohm. Meanwhile, it is possible that some differences exist for the electrical impedance of the plurality of transmission paths 43. Take the above-mentioned example for example. The values of the resistor of the resistors 72 connected to the four leads 71 are 0.3 Ohm, 0.7 Ohm, 1.8 Ohm, and 2.6 Ohm so the electrical impedances of the plurality of transmission paths 43 are 5 Ohm, 4.7 Ohm, 4.8 Ohm, and 4.6 Ohm. The difference of the electrical impedance of the plurality of transmission paths 43 is all smaller than 0.5 Ohm. It helps reduce the probability of false identification of the plurality of touch signals.

In other embodiments, the resistor 72 can be arranged on the non-display section of the array substrate 211. As for other arrangements of the plurality of leads, for example, the numerical value of resistance of the plurality of leads increases linearly or increases centered on one certain lead to both sides while the numerical value of resistance of the corresponding resistor 72 decreases linearly or decreases centered on one certain lead to both sides.

Figure 8:
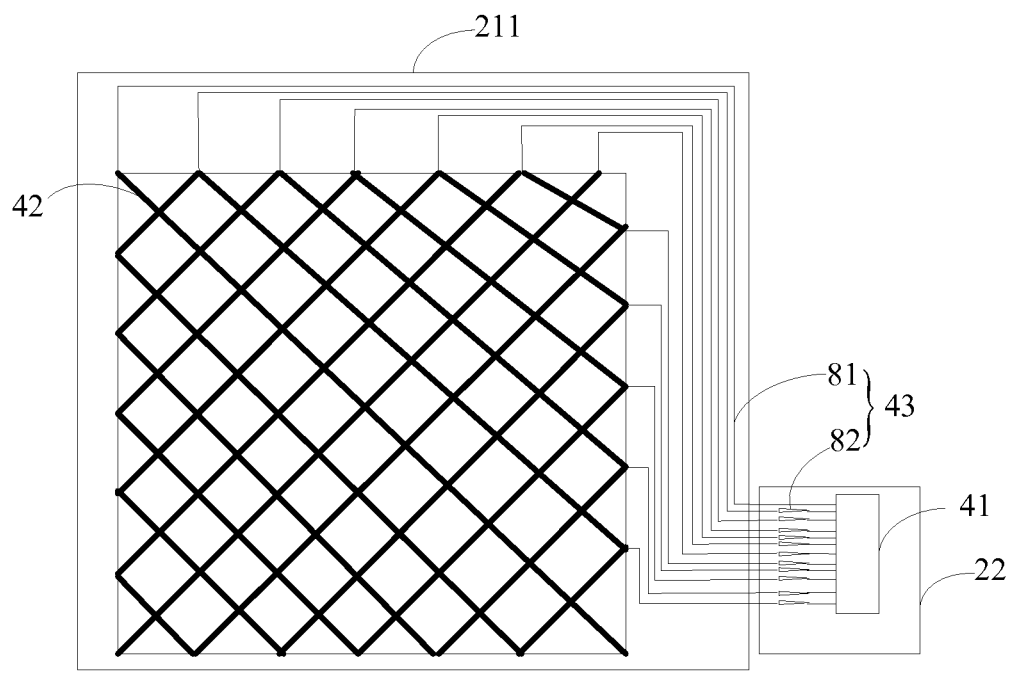
FIG. 8 shows a schematic diagram of an array substrate shown in FIG. 4 according to a third preferred embodiment of the present invention.

Please refer to FIG. 8. Each of the plurality of transmission paths 43 comprises a lead 81. At least some of the plurality of transmission paths 43 comprises an operational amplifier 82. The operational amplifier 82 comprises an input terminal connected to the lead 81 of the corresponding transmission path 43. The operational amplifier 82 comprises an output terminal connected to the touch detecting circuit 41. The operational amplifier 82 is used for amplifying a touch signal transmitted through the lead 81 of the corresponding transmission path 43 and outputting the amplified touch signal to the touch detecting circuit 41.

The plurality of leads 81 of the plurality of transmission paths 43 are arranged on the non-display section of the array substrate 211. The lengths of the plurality of leads 81 increase successively. At least some of the plurality of leads 81 having successively increasing lengths are connected to the operational amplifier 82 having a successively increasing ability to amplify signals. Since the touch signals from the plurality of touch detecting electrodes 42 are transmitted through the plurality of transmission paths 43, the difference of variations for the touch signals is smaller than a first predetermined value.

Because a longer lead has larger impedance, the variation of a touch signal is larger after being transmitted through a longer lead. Compare with a touch signal after being transmitted, the same touch signal before transmitted has much lower signal strength. The operational amplifier 82 is used for amplifying signals in this embodiment so that touch signals with decreasing strength can be amplified to a certain level and can reduce the variation of the touch signals. A signal passing through the longer lead 81 connected to the operational amplifier 82 is strongly amplified while a signal passing through the shorter lead 81 connected to the operational amplifier 82 is weakly amplified. Whether a signal is amplified strongly or weakly by the operational amplifier 82 depends on the length of the lead 81 for balancing the difference of variation of the touch signals passing through the leads 81 with different lengths. So, touch signals pass through corresponding transmission paths 43 and the difference of variation of each of the touch signals is small or even the same. Thus, the accuracy of signal identification increases for enhancing sensitivity of touch better.

In other embodiments, the operational amplifier 82 can be arranged on the non-display section of the array substrate 211. As for other arrangements of the plurality of leads, for example, the numerical value of resistance of the plurality of leads increases linearly or increases centered on one certain lead to both sides while the successively increasing ability of the corresponding operational amplifier 82 to amplify signals increases linearly or increases centered on one certain lead to both sides.

The touch detecting electrode is disposed on the array substrate and used as the common electrode of the array substrate in each of the embodiments. The touch detecting electrode can be located on the color filter substrate and used as the common electrode of the color filter substrate in other embodiments. In addition, the touch panel display device can further comprise a display panel with a display function and a touch panel with a touch function in other embodiments. The touch panel is located on the display panel. The touch detecting electrode is located in the touch panel.

The present invention further proposes an embodiment where an array substrate is used in a touch panel display device. The array substrate is the array substrate used in any of the embodiments mentioned above.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A touch panel display device, the touch panel display device being a liquid crystal display (LCD) with a function of touch detection, comprising:
   a touch detecting circuit;
   a plurality of touch detecting electrodes, used as common electrodes of the LCD; and
   a plurality of transmission paths, for transmitting a touch signal of the touch detecting electrode to the touch detecting circuit, the plurality of transmission paths comprising a first plurality of transmission paths and a second plurality of transmission paths, wherein one terminal of each of the first plurality of transmission paths connected to one of the plurality of touch detecting electrodes along a first direction, and the other terminal of each of the first plurality of transmission paths connected to the touch detecting circuit, one terminal of each of the second plurality of transmission paths connected to one of the plurality of touch detecting electrodes along a second direction, and the other terminal of each of the second plurality of transmission paths connected to the touch detecting circuit,
   wherein an electrical impedance of the plurality of transmission paths is identical so that a difference of variation for each touch signal of the plurality of touch detecting electrodes is smaller than a first predetermined value after being transmitted through each of the plurality of transmission paths, and the first predetermined value is a threshold by which false identification occurs among the touch signals from the plurality of touch detecting electrodes,
   wherein the touch panel display device comprises a display panel and an FPC, the plurality of touch detecting electrodes are arranged on the display section of the display panel, and the touch detecting circuit is arranged on the FPC;
   each of the plurality of transmission paths comprising a lead, at least some of the plurality of transmission paths comprising an operational amplifier, the operational amplifier comprising an input terminal connected to the lead of a corresponding transmission path, the operational amplifier comprising an output terminal connected to the touch detecting circuit for amplifying a touch signal transmitted through the lead of the corresponding transmission path;
   the plurality of leads of the plurality of transmission paths are arranged on the non-display section of the display panel, the lengths of the plurality of leads increasing successively, at least some of the plurality of leads having successively increasing lengths being connected to the operational amplifier having a successively increasing ability to amplify signals so that the difference of variations for the touch signals is smaller than the first predetermined value after being transmitted through each of the plurality of transmission paths.

2. The touch panel display device of claim 1, wherein the plurality of transmission paths are a plurality of leads, the length of plurality of leads are identical so that electrical impedances of the plurality of transmission paths are identical.

3. The touch panel display device of claim 2, wherein the touch panel display device comprises a display panel and a flexible printed circuit (FPC), the plurality of touch detecting electrodes are arranged on the display section of the display panel, and the touch detecting circuit is arranged on the FPC;

each of the plurality of leads comprising a first portion and a second portion, the first portion and the second portion being connected to each other, the first portion being located on a non-display section and connected to a corresponding touch detecting electrode, the second portion being on the FPC and connected to a corresponding touch detecting electrode, the length of the first portion decreasing successively, the length of the second portion increasing successively, the first portion and the second portion being connected so that the lengths of the plurality of leads are equal, or the difference of the length of the plurality of leads are smaller than a second predetermined value, and the second predetermined value being a threshold by which false identification occurs among the touch signals from the plurality of touch detecting electrodes.

4. The touch panel display device of claim 3, wherein a plurality of path layers are arranged on the FPC, the second portion of the plurality of leads are formed on surfaces of the plurality of path layers, respectively, the second portion extends along the plurality of path layers to the touch detecting circuit and are connected to the touch detecting circuit;

a bump being disposed on the surfaces of some of the plurality of path layers, the number of the bump of at least some of the plurality of path layers increasing successively, a surface of the bump as part of the surface of the path layer, the second portion of at least some of the leads passing through the surface of the bump on a corresponding path layer and extending along the path layer so that the length of the second portion increasing successively.

5. The touch panel display device of claim 1, wherein the touch panel display device comprises a display panel and an FPC, the plurality of touch detecting electrodes are arranged on the display section of the display panel, and the touch detecting circuit is arranged on the FPC;

each of the plurality of transmission paths comprising a lead, at least some of the plurality of transmission paths further comprising a resistor, the resistor and a lead of a corresponding transmission path connected in series, and the resistor arranged on the FPC;

the plurality of leads of the plurality of transmission paths arranged in the non-display section of the display panel, the length of the plurality of leads decreasing successively, a numerical value of resistance of a resistor corresponding to the at least some of the plurality of transmission paths increasing successively so that an electrical impedance of the plurality of transmission paths being identical, or the difference of the length of the plurality of leads are smaller than a third predetermined value, and the third predetermined value being a threshold by which false identification occurs among the touch signals from the plurality of touch detecting electrodes.

6. A touch panel display device comprising:
a touch detecting circuit;
a plurality of touch detecting electrodes; and
a plurality of transmission paths, for transmitting a touch signal of the touch detecting electrode to the touch detecting circuit, the plurality of transmission paths comprising a first plurality of transmission paths and a second plurality of transmission paths, wherein one terminal of each of the first plurality of transmission paths connected to one of the plurality of touch detecting electrodes along a first direction, and the other terminal of each of the first plurality of transmission paths connected to the touch detecting circuit, one terminal of each of the second plurality of transmission paths connected to one of the plurality of touch detecting electrodes along a second direction, and the other terminal of each of the second plurality of transmission paths connected to the touch detecting circuit, wherein a difference of variation for each touch signal of the plurality of touch detecting electrodes is smaller than a first predetermined value after being transmitted through each of the plurality of transmission paths, and the first predetermined value is a threshold by which false identification occurs among the touch signals from the plurality of touch detecting electrodes, wherein the touch panel display device comprises a display panel and an FPC, the plurality of touch detecting electrodes are arranged on the display section of the display panel, and the touch detecting circuit is arranged on the FPC;

each of the plurality of transmission paths comprising a lead, at least some of the plurality of transmission paths comprising an operational amplifier, the operational amplifier comprising an input terminal connected to the lead of a corresponding transmission path, the operational amplifier comprising an output terminal connected to the touch detecting circuit for amplifying a touch signal transmitted through the lead of the corresponding transmission path;

the plurality of leads of the plurality of transmission paths are arranged on the non-display section of the display panel, the lengths of the plurality of leads increasing successively, at least some of the plurality of leads having successively increasing lengths being connected to the operational amplifier having a successively increasing ability to amplify signals so that the difference of variations for the touch signals is smaller than the first predetermined value after being transmitted through each of the plurality of transmission paths.

7. The touch panel display device of claim 6, wherein an electrical impedance of the plurality of transmission paths is identical so that the difference of variations for the touch signals of the plurality of touch detecting electrodes is smaller than the first predetermined value after being transmitted through each of the plurality of transmission paths.

8. The touch panel display device of claim 7, wherein the plurality of transmission paths is a plurality of leads, the length of plurality of leads are identical so that electrical impedances of the plurality of transmission paths are identical.

9. The touch panel display device of claim 8, wherein the touch panel display device comprises a display panel and a flexible printed circuit (FPC), the plurality of touch detecting electrodes are arranged on the display section of the display panel, and the touch detecting circuit is arranged on the FPC;

each of the plurality of leads comprising a first portion and a second portion, the first portion and the second portion being connected to each other, the first portion being located on a non-display section and connected to a corresponding touch detecting electrode, the second portion being on the FPC and connected to a corresponding touch detecting electrode, the length of the first portion decreasing successively, the length of the second portion increasing successively, the first portion and the second portion being connected so that the lengths of the plurality of leads are equal, or the difference of the length of the plurality of leads are smaller than a second predetermined value, and the second predetermined value being a threshold by which false identification occurs among the touch signals from the plurality of touch detecting electrodes.

10. The touch panel display device of claim 9, wherein a plurality of path layers are arranged on the FPC, the second portion of the plurality of leads are formed on surfaces of the plurality of path layers, respectively, the second portion extends along the plurality of path layers to the touch detecting circuit and are connected to the touch detecting circuit;

a bump being disposed on the surfaces of some of the plurality of path layers, the number of the bump of at least some of the plurality of path layers increasing successively, a surface of the bump as part of the surface of the path layer, the second portion of at least some of the leads passing through the surface of the bump on a corresponding path layer and extending along the path layer so that the length of the second portion increasing successively.

11. The touch panel display device of claim 7, wherein the touch panel display device comprises a display panel and an FPC, the plurality of touch detecting electrodes are arranged on the display section of the display panel, and the touch detecting circuit is arranged on the FPC;

each of the plurality of transmission paths comprising a lead, at least some of the plurality of transmission paths further comprising a resistor, the resistor and a lead of a corresponding transmission path connected in series, and the resistor arranged on the FPC;

the plurality of leads of the plurality of transmission paths arranged in the non-display section of the display panel, the length of the plurality of leads decreasing successively, a numerical value of resistance of a resistor corresponding to the at least some of the plurality of transmission paths increasing successively so that an electrical impedance of the plurality of transmission paths being identical, or the difference of the length of the plurality of leads are smaller than a third predetermined value, and the third predetermined value being a threshold by which false identification occurs among the touch signals from the plurality of touch detecting electrodes.

12. The touch panel display device of claim 6, wherein the touch panel display device is an LCD with a function of touch detection, and the plurality of touch detecting electrodes are used as common electrodes of the LCD.

\* \* \* \* \*